United States Patent [19]

Harrison

[11] Patent Number: 4,986,382
[45] Date of Patent: Jan. 22, 1991

[54] POWER ASSISTANCE FOR VEHICLE STEERING MECHANISMS

[75] Inventor: Anthony W. Harrison, Birmingham, England

[73] Assignee: Lucas Industries Public Ltd. Co., Birmingham, England

[21] Appl. No.: 352,390

[22] Filed: May 16, 1989

[30] Foreign Application Priority Data

May 20, 1988 [GB] United Kingdom ............... 8811966

[51] Int. Cl.$^5$ .............................................. B62D 5/16
[52] U.S. Cl. .................................. 180/148; 180/150; 74/18.2; 74/422; 74/388 PS; 415/152.1; 415/910
[58] Field of Search ............... 180/132, 133, 148, 150, 180/137, 139, 145; 415/152.1, 910, 55.1, 55.4; 74/18.2, 422, 388 PS; 92/136

[56] References Cited

U.S. PATENT DOCUMENTS 4,646,868 3/1987 Rosell ............................... 74/422 X
4,728,260 3/1988 Ishii ............................. 415/152.1 X Primary Examiner—Charles A. Marmor
Assistant Examiner—Mitchell Bompey
Attorney, Agent, or Firm—Oldham & Oldham Co.

[57] ABSTRACT

In a power assistance system for a vehicle steering mechanism fluid pressure providing the assistance is supplied from a pump driven intermittently by an infinitely-variable electric motor. For a rack and pinion mechanism fluid pressure chambers are formed by sealing boots at each end of the rack, and are connected through the pump, which is operative to create a pressure differential between the chambers, and thus across the rack to provide power assistance. The electric motor is energized as required to drive the pump in the appropriate direction, and when the motor and pump are inoperative fluid is allowed to flow freely between the chambers to accommodate fluid displacement as a result of unassisted operation of the steering. The pump is preferably a turbine pump, which allows fluid flow when inoperative. The system provides power assistance efficiently, and relatively cheaply.

12 Claims, 3 Drawing Sheets

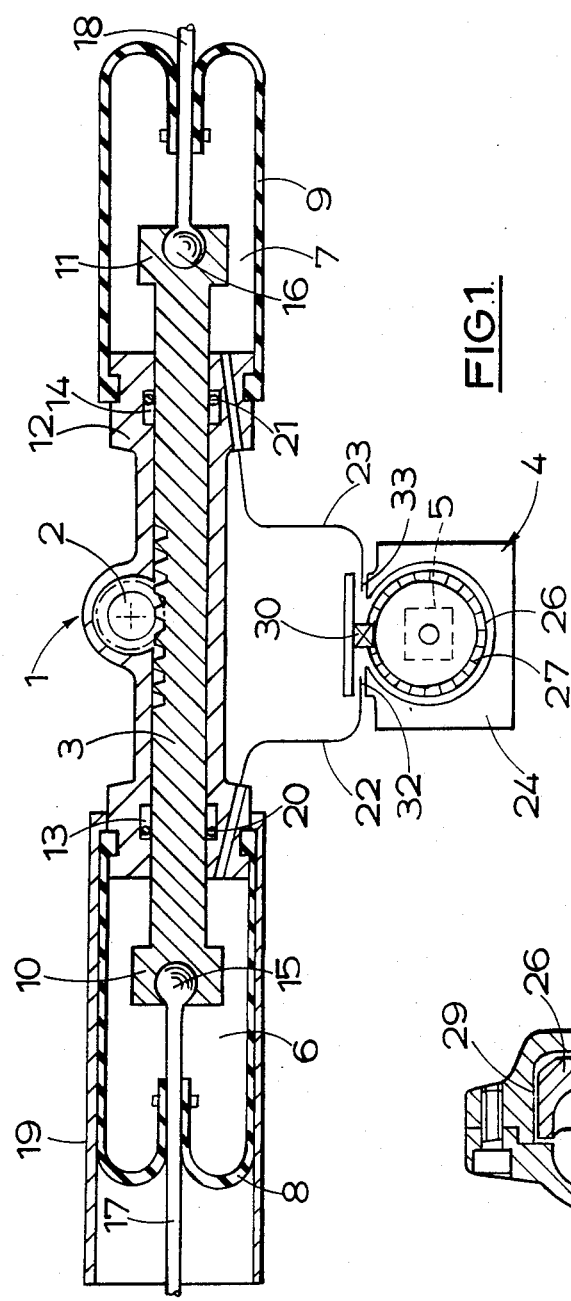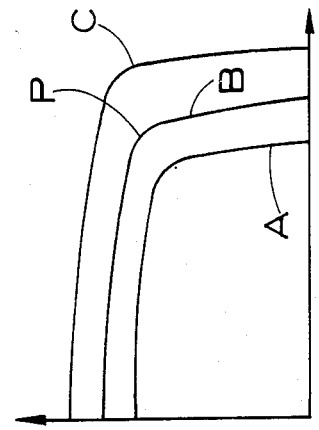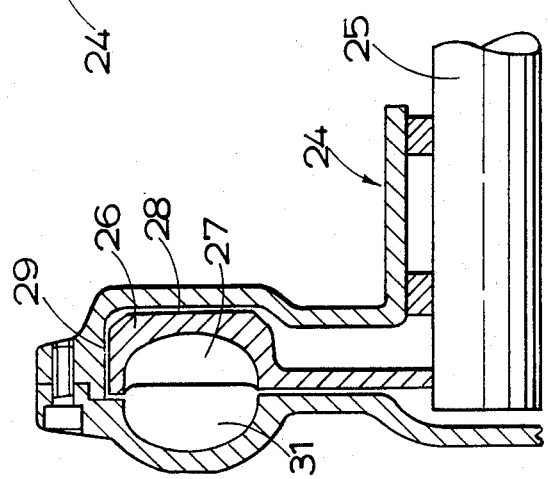

POWER ASSISTANCE FOR VEHICLE STEERING MECHANISMS

This invention relates to fluid-pressure operated power assistance systems for vehicle steering mechanisms.

In such a system it is important firstly to provide consistent "feel" at the steering wheel for the operator, and secondly to ensure that the system is simple in construction and efficient in operation, so that installation and running costs are reduced. In most systems, the fluid pressure acts on a double-ended actuator, whose piston is connected to the reciprocating steering member, and the fluid pressure may be supplied in various ways. For example, an open centre system gives good feel, but requires continuous circulation of the fluid, which is wasteful. To overcome this problem, a closed centre system can be used, with a servo operating from a supply of fluid pressure, but here it can be difficult and expensive to make the servo valves sufficiently responsive to provide good feel. In another type of system, shown in GB-A-2 154 189, fluid pressure is supplied by a reversible pump driven as required by an infinitely-variable electric motor. The pump supplies fluid from a reservoir to the appropriate chamber of a double-ended hydraulic actuator whose piston is connected to the reciprocating member, in this case the steering rack of a rack and pinion mechanism. This arrangement has the advantage that fluid pressure is generated only when power assistance is required, thus reducing running costs, while using the electric motor to operate the pump provides accurate control of the delivery of fluid pressure, so that consistent feel is ensured. However, the system is still relatively complex in construction, because of the actuator, and because in practice the system also requires several control valves.

According to our invention, in a fluid-pressure operated power assistance system for a vehicle steering mechanism having a rotary steering member operated by a steering wheel and a reciprocating steering control member with opposite ends, each end being provided with a sealing boot, fluid pressure is supplied to a pair of fluid pressure chambers, the pressure in the chambers acting in opposite directions on the control member, and each chamber being defined by a respective sealing boot.

This arrangement has the advantage of simplifying the construction as the actuator is no longer required, so that power assistance can be provided at a relatively low cost.

Preferably the fluid pressure is supplied from a reversible delivery pump driven intermittently by an infinitely-variable electric motor means, with the chambers being connected through the pump. This has the advantage of reducing the running costs, and providing constant feel.

Conveniently the pump is reversible in order to reverse the delivery of pressure fluid, and is driven by a reversible electric motor means.

The boots will normally have sufficient stiffness to provide the hydraulic circuit with adequate response, while also having sufficient flexibility to accommodate thermal expansion of the fluid. If so, then no further fluid reservoir is required. If not, then a separate fluid reservoir is provided. The reservoir is preferably pressurised, in order to avoid the generation of vacuum on the low pressure side of the pump.

The pump is preferably a turbine pump, that is, one in which a turbine-like impeller rotates in a housing to circulate fluid in a circumferential channel, the channel including a partition separating a pair of delivery ports. Such a pump has the advantage of creating the required fluid pressure at relatively low speeds and with a substantially constant fluid flow rate. Furthermore, this type of pump allows unrestricted fluid flow when it is inoperative, so that it does not affect manual (unassisted) operation of the steering mechanism. Where a separate reservoir is provided, it is preferably connected into the pump, either at the partition or diametrically opposite the partition.

A centrifugal pump may be used, but will need to run at a higher speed to create the required fluid pressure. Alternatively, positive displacement pumps may be used, such as gear or vane pumps. These will require by-pass means to allow fluid flow during manual operation of the steering mechanism. The by-pass means conveniently comprises a by-pass passage including a valve which closes the passage when the electric motor means is operative, but opens it otherwise. Where a separate reservoir is provided, it is preferably connected into the by-pass means, and is closed and opened by the valve with the by-pass passage. The valve may comprise a solenoid-operated valve.

The steering mechanism may be of the rack and pinion type, where the rotary member comprises the pinion and the reciprocating member comprises the rack.

Various embodiments of our invention are illustrated in the accompanying drawings, in which:

FIG. 1 shows a general arrangement of a fluid-pressure operated power assistance system for a vehicle steering mechanism;

FIG. 2 shows a diagrammatic part-section through a turbine pump;

FIG. 3 is a graph of pressure drop against flow rate for the pump of FIG. 2;

Figure 4:
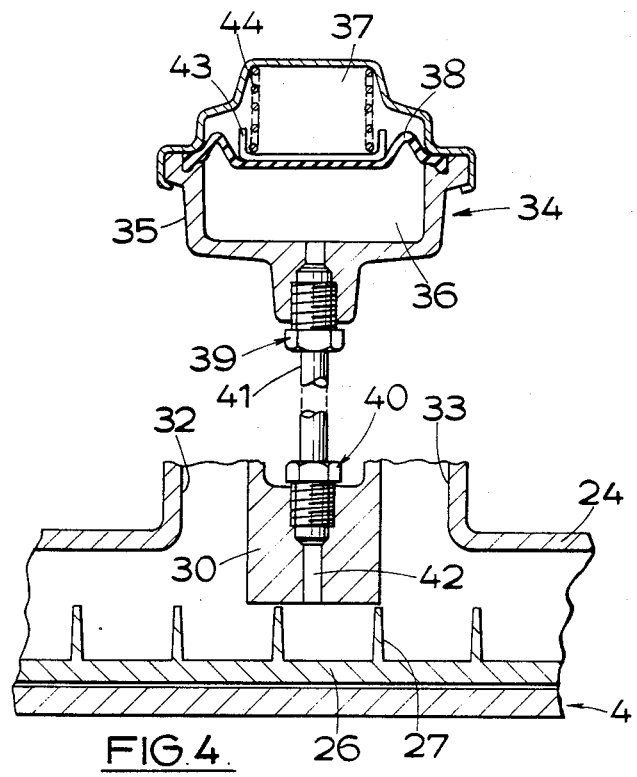
FIG. 4 is a part-section through a turbine pump showing a connection with a fluid reservoir.

FIG. 1 shows a rack and pinion steering mechanism 1 having a rotary pinion 2 operated by a steering wheel (not shown) co-operating with a reciprocating steering rack 3, and a fluid-pressure operated power assistance system in which fluid pressure is provided by a reversible delivery turbine pump 4 driven intermittently by an infinitely-variable reversible electric motor 5, and delivered to pressure chambers 6,7 connected through the pump 4 and defined in sealing boots 8,9 provided on opposite ends 10,11 of the rack 3, the pressure in the chambers 6,7 acting on the rack 3 in opposite directions.

The mechanism 1 has a housing 12, in which are located the rack 3 and pinion 2, with the rack 3 supported by bushes 13, 14. At each end 10, 11 of the rack 3 there is a ball joint 15, 16' respectively, connected to a respective track rod 17, 18 in the usual way. The boots 8,9 provided at the respective ends 10,11 of the rack 3 are of the conventional rolling type which seal between the housing 12 and the track rod to prevent dirt entering the mechanism 1, as well as being able to retain pressure fluid to form the chambers 6,7. The boots 8,9 may be supported in a tubular guide 19 (shown for the boot 8 only), or remain unsupported, as the boot 9. Each pressure chamber 16, 17 is sealed from the housing 12 by a respective seal 20, 21, and the chambers 6, 7 are connected to the pump 4 by flexible pipes 22, 23.

The pump 4 is of a well-known reversible turbine type, having a housing 24 supporting a driven shaft 25, which rotates an impeller 26 having radial vanes 27. A channel 28 is formed by a radial clearance between the outer peripheral edge 29 of the impeller 26 and the housing 24, and this is in communication with a side channel 31, located adjacent the vanes 27 of the impeller 26 (see FIG. 2). A radial partition 30, is formed in the housing 24, and blocks the channels 28, 31. Delivery ports 32,33 are provided, one on each side of the partition 30, connecting into the channel 31, and the pipes 22 23 are connected to the ports 32,33. When the impeller 26 is rotated, the fluid in the vanes 27 has a circumferential velocity, and is also urged outwardly due to centrifugal force. This sets up a helical circulation of fluid in the side channel 31 and the vanes 27. Circumferential momentum is therefore transferred efficiently from the impeller 26 to the fluid in the side channel 31, which is thus coupled effectively to the impeller 26. In operation, a substantial pressure drop is created across the partition 30, which directs fluid flow into and out of the ports 32,33 and pipes 22, 23 in accordance with the direction of rotation of the impeller 26. When the pump 4 is not operating, fluid is allowed to flow freely between the pipes 22, 23, through ports 32,33 and channels 28, 31.

The electric motor 5 for operating the pump 4 may be of any suitable infinitely-variable reversible type. It is operated only when power assistance is required, and any suitable method of controlling the speed and direction of rotation of the motor 5 may be used, based on measurement of the steering column torque or the steering angle. Measurement of the steering angle may be used when the steering mechanism is to be operated manually for normal driving, to give maximum sensitivity and feedback, with power assistance for parking and manoeuvring at low speeds, when the steering is heavy and sensitivity is not so important.

When power assistance is not required, the motor and the pump are inoperative, and fluid displacement caused by movement of the rack 3 during manual operation is accommodated by fluid flow between the chambers 6,7 through the pump 4, this flow being unrestricted.

When power assistance is required, the motor 5 is energised, and the pump 4 is operated to deliver pressure fluid to one of the chambers, say chamber 6. This creates a pressure differential across the rack 3, which moves to assist the manual operation. The fluid displaced from the chamber 7 as a result of this movement is accommodated by the operation of the pump 4. The speed of the motor 5 is varied in accordance with the measurements from the steering mechanism, in order to vary the pressure delivered by the pump 4, and thus the amount of power assistance. When assistance is no longer required, the motor 5 is de-energised, so that the pump becomes inoperative, and the steering returns to manual operation.

The operating characteristics of the pump 4 are shown in the graph of FIG. 3, which shows the relationship between the flow rate through the pump and the pressure drop across it at three constant speeds. Looking at curve A, it will be seen that for a given speed as the pressure drop increases the flow rate decreases very slowly, until a critical pressure drop P is reached, the flow rate then decreasing rapidly. Curves B and C show a similar relationship for lower and higher speeds respectively, but with the critical pressure drop varying with the speed of the pump. However, provided that the critical value is not reached, the output from the pump varies predictably in accordance with the speed of the pump as determined by the motor, so that it is easy to control.

Figure 5:
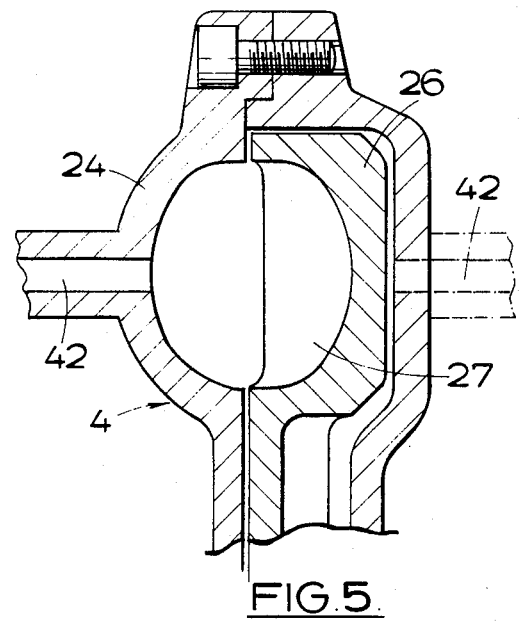
FIG. 5 is a further part-section through the pump showing further reservoir connections.

The boots 8,9 and the flexible pipes 22,23 will normally provide the hydraulic circuit with sufficient stiffness for an adequate response, and with sufficient flexibility to accommodate thermal expansion of the fluid, so that no separate fluid reservoir is required. FIGS. 4 and 5 show modifications where a separate reservoir is required.

In a turbine pump the pressure at any circumferential point in the channel 31 varies with the direction of rotation of the impeller 26, except at the middle of the partition 30 and a point diametrically opposite. These two points are therefore the ideal connecting points for a separate reservoir. FIG. 4 shows the connection point in the partition and FIG. 5 the other point.

FIG. 4 shows a scrap section, taken normal to a radius, through the pump 4 of FIG. 1 in the region of the partition 30, and a fluid reservoir 34. The reservoir 34 has a two-part housing 35 divided into two chambers 36,37 by a flexible diaphragm 38 trapped between the housing parts. The chamber 36 contains fluid, and is connected by appropriate connectors 39,40 and pipe 41, to a reservoir port 42 in the partition 30. The chamber 37 houses a piston 43 and spring 44 acting on the diaphragm 38 to pressurise the fluid in the chamber 36 to a moderate level. This prevents vacuum being generated on the low pressure side of the pump 4 when it operates. During operation of the pump 4, pressure is generated at the port 42, and unless the fluid in the reservoir chamber 36 is pressurised, fluid will be pumped to the reservoir chamber 36 as well as the appropriate chamber 6 or 7, creating a vacuum on the low pressure side of the pump 4. In a modification, not shown, the piston 43 and spring 44 are omitted, and the chamber 37 contains gas pressurised to a moderate level.

FIG. 5 is a part-section, similar to FIG. 2, through the pump 4, showing the location of the reservoir port 42 at a point opposite of the partition 30. There are two possible locations for the port 42, the first (shown in solid lines) being in the side channel 31, and the second (shown in dotted lines) being behind the impeller 26. The fluid reservoir is not shown, but is the same as in FIG. 4.

The operation of the system of FIGS. 4 and 5 is the same as that described in relation to FIGS. 1 to 3, with fluid flow between the reservoir 34 and the circuit occurring only when the fluid volume changes.

In modifications (not shown) different types of pump may be used instead of the turbine pump 4. For example, a centrifugal pump can be used, although it will need to be larger, and to run at a higher speed in order to produce the required pressure. Further, its operating characteristics are different, as the flow rate decreases more quickly as the pressure drop increases, so that it is not as suitable as the turbine pump 4.

Figure 6:
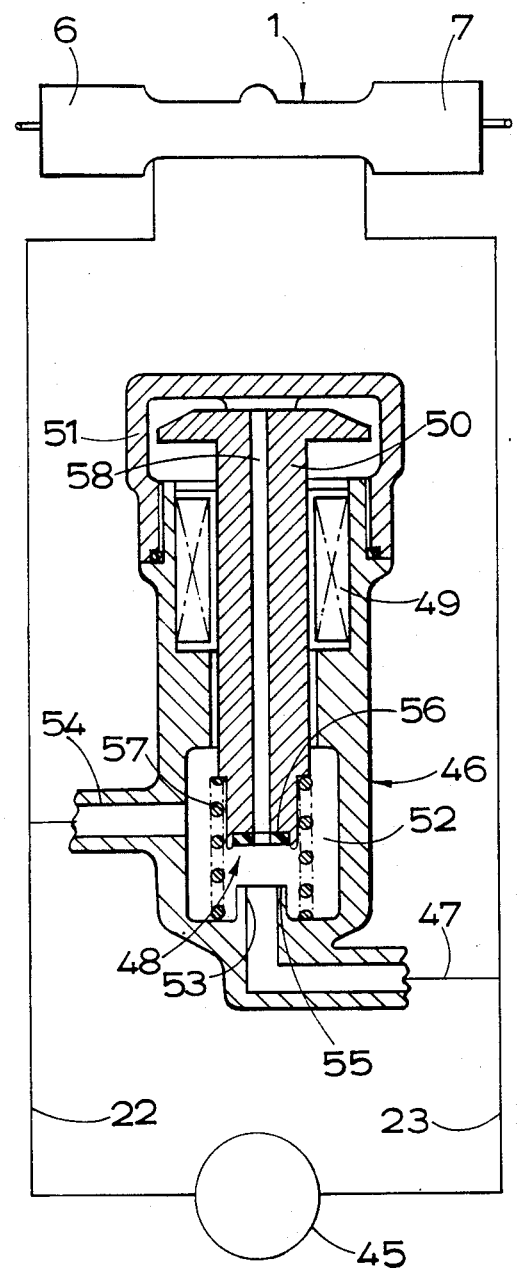
FIG. 6 is similar to FIG. 1, but shows a modification with a positive-displacement pump.
Figure 7:
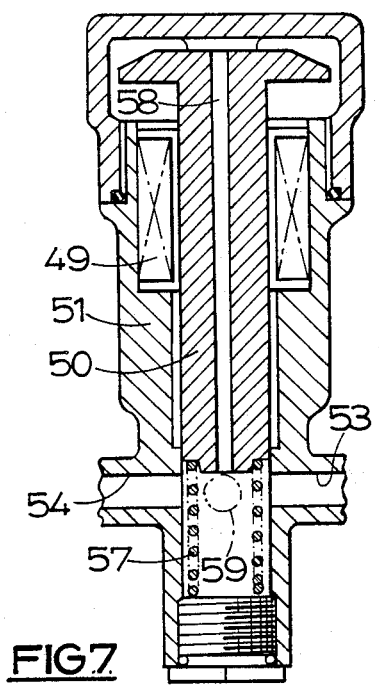
FIG. 7 shows a modification of FIG. 6.

Positive displacement pumps, such as gear or vane pumps may also be used. However, as positive displacement pumps do not allow fluid flow when they are inoperative, it is necessary to provide fluid by-pass means to accommodate the fluid displacement from the chambers 6, 7 when the steering is operated manually. FIGS. 6 and 7 illustrate systems of this type. In FIG. 6 the general arrangement of the system is similar to that of FIG. 1, and corresponding reference numerals have been applied to corresponding parts. The pump 45 is of the positive-displacement type, and by-pass means 46 are included, in the form of a by-pass passage 47 connected between the pipes 22,23 in parallel with the pump 45, and a solenoid-operated valve 48 which closes the passage 47 when the motor 5 operates, but opens it when the motor is inoperative to allow fluid flow between the chambers 6,7. The solenoid-operated valve 48 is of conventional type, with a coil 49 and an armature 50 located in a housing 51, which includes a fluid chamber 52 with ports 53,54 for connection into the passage 47. The first port 53 has a valve seating 55, which co-operates with a valve member 56 on the armature 50. A spring 57 biasses the armature 50 away from the seating 55, and on energisation of the coil 49 the armature 50 moves to overcome the force in the spring 57 to close the valve 55,56. The armature 50 also has a longitudinal through-passage 58 which ensures that the pressure across it is equalised when the valve is closed, so that on de-energisation of the coil 49 the spring 57 returns the armature 50 quickly to allow rapid opening of the valve.

In operation, the solenoid coil 49 is de-energised while the motor 5 is inoperative, to allow fluid flow, and on operation of the motor 5 the coil 49 is energised to close the passage 46, allowing the system to operate as described in relation to FIG. 1.

FIG. 7 shows a modification of the by-pass means 46 where a separate reservoir (not shown) is provided. The housing 51 is modified so that the ports 53,54 are aligned, and a further port 59 for connection to the reservoir is also provided. The valve member 56 is omitted, and instead the armature 50 slides in the housing 51 to control communication between all three ports 53,54,59. The remainder of the construction and operation of FIG. 7 is the same as that of FIG. 6. It will be noted that when the motor 5 is inoperative the reservoir port 59 is open, but when the motor 5 operates this port is closed, although there may be slight leakage past the armature 50. However, the arrangement prevents fluid being pumped back to the reservoir when the system operates, so that in this embodiment the reservoir may be unpressurised.

In an alternative arrangement (not shown) for a gear pump, an electric motor is used which generates end thrust as well as torque, and the pump includes a pressure plate sealing across the ends of the gears. In one embodiment the plate is held in engagement with the gears by the end thrust from the motor, so that when the motor is inoperative the pressure plate is released, providing a by-pass past the gears. In another embodiment the plate is held closed by pressure bled from the pump, this pressure being released by a valve held closed by the end thrust from the motor.

Positive displacement pumps have the advantage that they have same operating characteristics as the turbine pump, with the value of the critical pressure drop being determined by the pressure-relief valve or valves.

It will be appreciated therefore that a turbine pump is particularly suited for use in this system, as it operates efficiently at relatively low speeds, its output is easily controlled and it enables a very simple construction to be used. Overall, the invention provides effective power assistance for a vehicle steering mechanism very simply and cheaply.

I claim:

1. A fluid-pressure operated power assistance system for a vehicle steering mechanism having a rotary steering member for operation by a steering wheel and a reciprocating steering control member, said control member having opposite ends, and a sealing boot provided on each said end, said system including a source of fluid pressure, and a pair of fluid pressure chambers to which fluid from said source is supplied, the pressure in said chambers acting in opposite directions on said control member, wherein each said chamber is defined by a respective one of said sealing boots and each said end of said control member is contained wholly within said respective chamber defined by said boot, whereby the pressure in each said chamber acts directly on said respective end of said control member.

2. A fluid-pressure operated power assistance system as claimed in claim 1, wherein said source of fluid pressure comprises a reversible delivery pump, and an infinitely-variable electric motor means for driving said pump intermittently, said chambers being connected through said pump.

3. A fluid-pressure operated power assistance system as claimed in claim 2, wherein said pump is reversible in order to reverse delivery.

4. A fluid-pressure operated power assistance system as claimed in claim 1, wherein said system includes a separate fluid reservoir.

5. A fluid-pressure operated power assistance system as claimed in claim 4, wherein said reservoir is pressurised.

6. A fluid-pressure operated power assistance system as claimed in claim 2, wherein said pump comprises a turbine pump having a housing including a circumferential fluid channel and a pair of delivery ports, an impeller reversibly rotatable in said housing to circulate fluid in said circumferential channel, said channel including a partition separating said pair of delivery ports.

7. A fluid-pressure operated power assistance system as claimed in claim 6, wherein a reservoir is provided, and connected into said pump at said partition.

8. A fluid-pressure operated power assistance system as claimed in claim 6, wherein a reservoir is provided and connected into said pump at a point diametrically opposite said partition.

9. A fluid-pressure operated power assistance system as claimed in claim 2, wherein said pump is a positive displacement pump, and a by-pass means is incorporated to allow fluid flow past said pump when said electric motor means is not operating.

10. A fluid-pressure operated power assistance system as claimed in claim 9, wherein said by-pass means comprises a by-pass passage including a valve, said valve being operative to close said passage when said electric motor means is operative, and to open said passage when said electric motor means is inoperative.

11. A fluid-pressure operated power assistance system as claimed in claim 10, wherein a separate reservoir is provided, said reservoir being connected into said by-pass means, with said valve controlling said connection.

12. A fluid-pressure operated power assistance system as claimed in claim 1, wherein said steering mechanism comprises a reciprocating rack and a rotary pinion.

* * * * *